June 18, 1929.　　　M. BARODY　　　1,717,647

PROCESS FOR PEELING PEACHES

Filed Aug. 18, 1925

INVENTOR
Moses Barody
BY
ATTORNEY

Patented June 18, 1929.

1,717,647

UNITED STATES PATENT OFFICE.

MOSES BARODY, OF ALBANY, NEW YORK, ASSIGNOR OF ONE-HALF TO CHARLES H. ANDROS, OF NASSAU, NEW YORK.

PROCESS FOR PEELING PEACHES.

Application filed August 18, 1925. Serial No. 51,050.

My invention relates to the process and apparatus for separating the skins from fruit and it is particularly adapted for removing the skins from peaches which, in the ripe condition, have a more or less soft body portion and a tender skin. It is also particularly adapted for use in peeling peaches which are not wholly ripened and maintaining the meats in such condition that the color of wholly ripened fruit may be imparted thereto by the canning and cooking process. In preparing peaches and the like for canning it is very desirable that the fruit should be peeled and cooked in such a way that it will be attractive to the consumer. The true color of the wholly ripened peach should be preserved and the canned fruit is preferably presented to the consumer in halves which retain their original shape, color and smoothness without any mutilation. I am aware that there are many machines and processes now known in the art which purport to peel peaches so that the color and shape of the meat is preferably preserved, but the practical difficulties encountered in performing an operation of this kind by purely mechanical means are very great. Due to variations in the character of the fruit itself and variations in the temperature and strength of the bath in which the fruit is immersed, either the fruit is burned, imperfectly peeled, or mutilated in the process. The proper time of immersion varies, and it can only be precisely determined in any instance by means of the eye.

The primary objects of my invention, therefore, are to provide an extremely simple process, and apparatus for facilitating the process, by means of which the peeled product will be invariable and perfect.

Another object of my invention is to provide a process and apparatus whereby a greater quantity of fruit may be peeled in less time than with the methods now in use.

With these objects in view, my invention consists in the process, and in the apparatus and the combinations and arrangements thereof hereinafter described and illustrated in the accompanying drawing in which—

Figure 4:
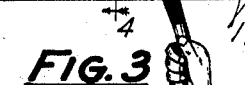
Fig. 4 is an enlarged section of Fig. 3 on the line 4—4.
Figures 5, 6:
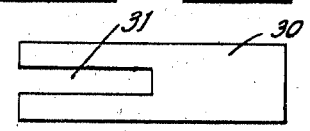
Figs. 5 and 6 and 7 are details of my apparatus.
Figure 7:

Referring to the drawing, 1, represents a tank of the usual character and adapted to contain a hot liquid. For the purpose of maintaining this liquid at nor near the boiling point of water, pipes, 2, may be immersed in the tank through which live steam may be circulated. If steam is not available, the tanks may be designed to be placed over a fire, or the liquid may be maintained at the proper temperature by any other convenient means. 3, represents generally a foraminous container, preferably cylindrical in shape and about thirty inches in length and eight inches in diameter. Where the peaches are peeled in halves, I find that a diameter of about eight inches is the maximum which can be used and get perfect results. But where the peaches are peeled whole, this diameter may be slightly increased, say to 10 or 12 inches, without injurious results. In either case, the length of the cylinder may be indefinitely increased but any substantial increase in the diameter will result in a bruised and mutilated product. I prefer to construct the sides of the container of wire screening, 4, having about nine meshes to the square inch. The standard commercial screening of this size is very satisfactory, because the wire used is of such size as not to cut into the fruit or vegetable and the spacing between the wires is such as to provide a proper supporting surface for the peach without marking or bruising. The size of the mesh is quite important, and while it may be varied to some slight extent, it is my experience that four meshes per square inch are entirely too few, and twenty-five meshes per square inch are entirely too many. In other words the number of meshes per linear inch must be between two and five and preferably should be about three. Peaches may be peeled by screen cylinders of larger or smaller mesh and of larger or smaller diameter than I have here pointed out but the work cannot be successfully and practically accomplished, whereas by my cylinder the work is quickly and perfectly done. The ends, 5, of the container may be formed of sheet metal, perforated as shown at, 6 and 7, but preferably covered on the inside by wire mesh, as shown in Fig. 4. The end, 8, is permanently secured to and forms a bottom for the container, but the end, 9, which forms a cover for the container is removable. The cover, 9, is provided with oppositely disposed helical slots, 10, which coact with pins, 11, fixed to the container. Projecting from the center of the end, 8, is a short shaft, 12, and projecting from the center of the end, 9, is a shaft, 13, terminating or provided with a hand crank, 14. To provide a bearing for the shaft, 13, the side of the tank is notched, as shown in Fig. 6, and the interior of the notch may be lined with thin metal, 15, to prevent wear.

Figure 1:
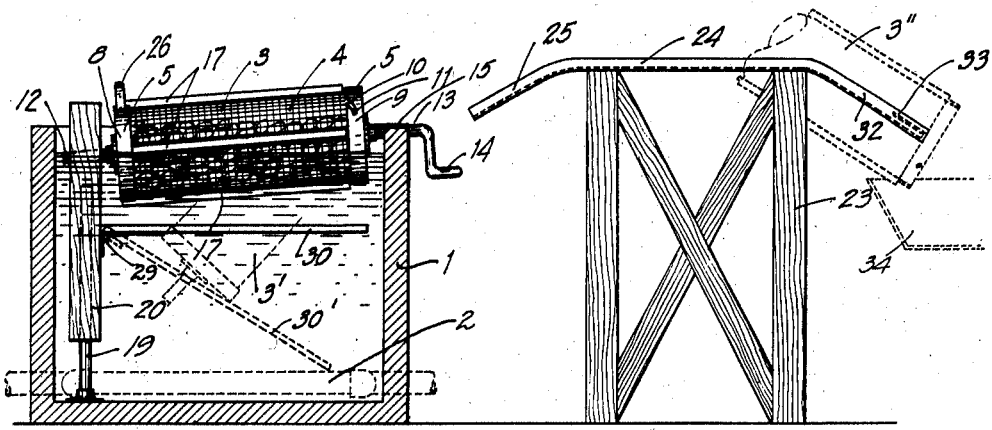
Fig. 1 is an elevation view in part section of my apparatus.
Figures 2, 3:
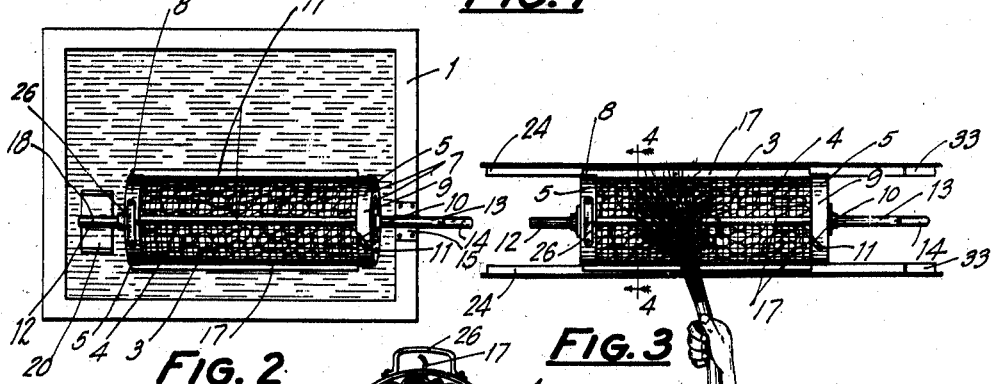
Fig. 2 is a plan view of the apparatus shown at the left in Fig. 1.
Fig. 3 is a plan view of the apparatus shown at the right in Fig. 1 with a part of the apparatus shown in Fig. 2 transferred thereto.

Unless reinforced, the loaded container will sag when supported in its bearings. To prevent this I provide the longitudinally extending reinforcing bars, 17. These bars are preferably small metal angles having one leg substantially tangential to the cylinder and the other leg curving outwardly therefrom. In addition to stiffening the container these angle bars act somewhat as paddle-wheels to lift the solution and the scum thereon and throw it over the top of the unsubmerged fruit therein whereby it is constantly lubricated and harsh abrasion is prevented. They also form a supporting means for the container when it is upon the washing rack as shown in Fig. 3. When the container is positioned on the tank, the shaft, 12, is adapted to ride in a bearing, 18, which is preferably constructed as follows:

Fixed within the tank in the proper position is a pipe, 19, adapted to receive the bearing member, 20. The member, 20, is preferably of wood and is provided with a vertically extending recess into which a section of pipe, 21, is driven. The pipe, 21, is of such size that it is adapted to fit rather loosely over the pipe, 19. Interposed between the top of pipe, 19, and the top of the recess in the member, 20, is a light spiral spring 22. The length and strength of the spring, 22, should be such that when the loaded container is placed in the bearing, as shown in Fig. 1, the container will have a slope of about one inch in two feet, and will flex somewhat as the fruit is tumbled about in the container. To facilitate the placing of the loaded container in position in the tank, the upper end of the member, 20, is splayed or V shaped as shown in Fig. 5. The purpose of this spring mounted bearing loosely fitting over pipe, 19, is to give a slight wobbling movement to the loaded container as it is rotated upon its axis, thus facilitating the gentle abrasive action by which I loosen the skins on the fruit. Hinged, as at 29, to the member, 20, at a point sufficiently below the bearing, 18, to provide clearance, is a board, 30, which normally floats in a horizontal position as shown by the solid lines in Fig. 1. This board is prevented from rising beyond the horizontal position by contact, near the hinge, with member, 20, but may drop to the position, 30, when the container sinks thereon, as shown at, 3'. The board, 30, is preferably somewhat wider than member, 20, and is notched as shown at, 31, to permit the entrance of shaft, 12. This board functions as a support for the loaded container when shaft, 12, is withdrawn from its bearing, and also functions as an agitating means for the solution in the tank.

Spaced, about as shown in the drawing, from the tank, 1, is the washing rack, 23, which is preferably provided with the angle rails, 24, spaced to permit the container to ride between them and be supported upon them by means of the angles, 17. In order to facilitate the transfer of the container from the tank to the washing rack the rails, 24, may be bent downwardly toward the tank as shown at, 25. At the opposite end, the rails, 24, are bent downwardly, as at 32, at a slope sufficient to discharge the contents of the container by gravity when supported thereon. To provide a means for holding the container on the discharging end of the rack, I bend up the horizontal legs of the rails, as shown at 33, to provide recesses adapted to receive the ends of the angles, 17. These recesses may obviously be formed by securing a piece of metal parallel to but offset from the horizontal legs of the rails.

My process and the operation of my apparatus is as follows:

In preparing the peaches for peeling it is customary to cut them in half and remove the pits. They may, of course, be peeled without cutting and pitting, and they may be canned without cutting or, they may be cut and pitted after the peel has been removed. However, for sanitary reasons, in my improved process I prefer they should be halved and pitted before peeling. In order that the peaches may be handled with a minimum of bruising and for another purpose which I will later point out, I prefer, before pitting, to chill them sufficiently to make the meats firm. Forty degrees Fahrenheit produces fairly satisfactory results but the product is improved by cooling or chilling to slightly above the freezing point. The cover, 9, of the container is removed, a sufficient quantity of the chilled meats is introduced to fill the container about two-thirds full, and the cover, 9, secured in place. The tank, 1, is filled with water to about the level shown in Fig. 1 and this water is maintained at the boiling point by any suitable means. To this water should be added a certain small proportion of lye or commercial caustic soda. The purpose of the caustic soda is to produce a slippery, slimy or saponaceous scum on the solution in which the peaches are abraded. This causes the peaches to slip smoothly about on each other and against the sides of the container without bruising or mutilating the meats. I prefer to use just enough caustic to produce the slimy scum above mentioned and, in a tank of sixty gallons capacity from six to fifteen pounds will be found sufficient. It is to be understood that my process may be performed by boiling water alone but the peaches are somewhat bruised and frequently disfigured by contact with the sides of the container. The operator grasps the container by means of the handle, 26, and the shaft or crank at the other end and places it in the position shown in Figs. 1 and 2 so that it is partly immersed in the hot solution. The crank is then turned a few times until the skin on the fruit is cracked, loosened, and somewhat peeled. When the solution is fresh this operation will not require more than about eight seconds. As the solution becomes weakened through its action on a large quantity of fruit it becomes necessary to subject the meats to the mild abrasive action in the solution for a somewhat longer period. Where fruit is being continuously peeled, the water or solution should be cleansed of suspended particles of skin every fifteen minutes or so by scooping them out with a screen or sieve. It is quite difficult to describe the precise time at which the fruit should be removed from the solution, but it is also quite important that the meats should not be subjected to the action of the solution for too long a period. When the peaches are left too long in the solution, they become heated throughout and softened to such an extent that a considerable portion of the meats is lost by abrasion and they are flattened and mutilated by the next step of my process. When they are not subjected to the gentle abrasive action for a sufficiently long time the peel is not satisfactorily removed by the next step of the operation. I find that the precise time for stopping the abrading process is best determined by the experienced eye. The skins should be broken and loose, rubbed off in spots, but not entirely rubbed off, and the meats should appear to be of a very faint sky-blue color. The skins may, of course, be entirely removed by this step, but the meats are mutilated and a considerable quantity lost by rubbing off if they are abraded to that extent. A very important function of the cooling or chilling of the meats before the immersion in the boiling water or solution of caustic soda is to permit their remaining in the hot solution a sufficient length of time to satisfactorily perform this step without increasing the temperature of the meats to a point where they will become softened or cooked. Another important function is the sudden and comparatively great increase in temperature of the skins on immersion which expands and separates them from the relatively cold body of the fruit.

Figure 8:
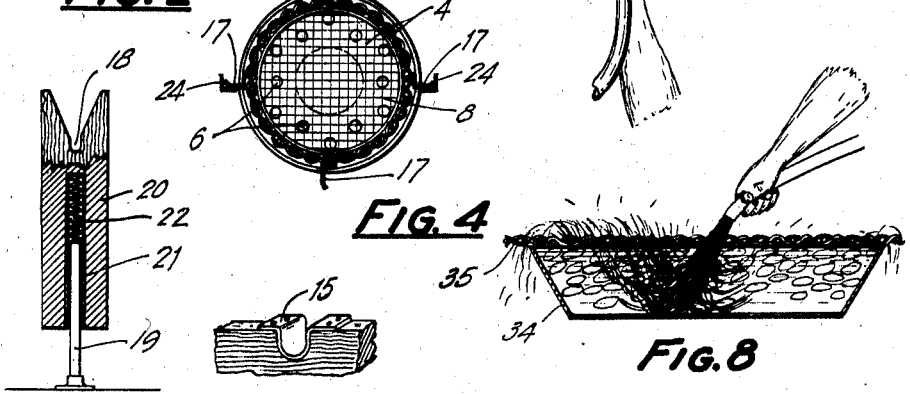
Fig. 8 illustrates how the peeled product may be thoroughly washed without mutilation.

When the time for removal from the hot bath has been reached the operator transfers the loaded container to the rack, 23, as shown in Fig. 3 and immediately subjects the meats to the action of a jet of clean, cold water. The water should flow at a substantial velocity and I prefer that the water pressure on the system which produces the jet should not be less than eighty pounds per square inch. The jet is conveniently applied by means of a hose, as shown in Fig. 3 and the meats are directly agitated by the jet of water which removes the greater portion of the caustic solution, cleans and cools them, and removes the skin which is forced out through the meshes of the screen. When this step of the operation is thoroughly performed the cover, 9, is removed and the contents of the container discharged into a suitable receptacle, 34. To facilitate this discharging, I prefer to bend the rails, 24, as shown at 32, so that the container may be pushed over to and released on the incline where it will be held by the coaction of the reinforcing bars, 17, with the recesses at 33. To prevent bruising the meats when discharged from the container, the receptacle, 34, should be partially filled with water, and the meats should be thoroughly washed again to entirely remove the caustic by placing a coarse screen, 35, over the receptacle and the meats agitated by a jet of clean, cold water manipulated as shown in Fig. 8. This produces a constant change of water and results in a perfectly cleansed product. The meats are churned about by the jet, which carries with it considerable air into the water, and the caustic is carried away in the form of froth or foam which flows over the side of the receptacle.

Where it is not necessary or desirable to preserve the fruit in an unmutilated condition it is not essential that the fruit be chilled before immersing in the hot bath, nor is it necessary that a caustic solution be used in such a case for the peeling may be quite satisfactorily done by means of hot water alone. However, in any case, the best results are obtained by first cooling the fruit not only because it seems to make the meats firm and to prevent their being cooked or burned during the immersion but because the sudden change of temperature produced in the skin by the immersion seems to expand it and cause it to become loosened from the cooler meat.

To obtain the best results, my abrading step should be performed at the surface of a boiling caustic bath, and it will be apparent from a consideration of Fig. 1 that during the abrading, the fruit is alternately exposed to the air and immersed in the solution. The reason why the best results are obtained at the surface of the bath is because of the slimy scum on top of the solution. This scum is carried up on the surface of each peach as it rises from the solution and acts as a lubricant which prevents bruising or marking of the meats.

While I have described my process and apparatus in some considerable detail it is to be understood that the process is no wise limited to the particular apparatus herein described and illustrated. And it is to be further understood that the words which I have used in describing my process and apparatus are words of description and not words of limitation.

What I claim is:

1. The process of peeling peaches which comprises cooling the peaches to a point slightly above thirty-two degrees Fahrenheit, immersing in a boiling solution of caustic soda to loosen and partially disintegrate the skins, and thereafter washing the peaches.

2. The process of peeling peaches which comprises cooling to a degree sufficient to make the meats firm, subjecting the peaches to a gentle abrasive action in a liquid at about two hundred and twelve degrees Fahrenheit sufficiently to break and partially remove the skins, and thereafter completely removing the skins by the impinging action of a jet of water of substantial volume.

3. The process of peeling peaches which comprises cooling to a degree sufficient to make the meats firm, subjecting the meats to an abrasive action in a caustic solution at boiling temperature sufficiently to break and partially remove the skins, and thereafter agitating the peaches by a jet of water of substantial volume to wash and completely remove the skins.

4. The process of peeling peaches which comprises chilling to a degree sufficient to make the meats firm, breaking and loosening the skins by subjecting the meats to a mild abrasive action alternately above and below the surface of a caustic solution at about two hundred and twelve degrees Fahrenheit of sufficient strength to produce a lubricating film on the surface of the fruit, and thereafter completely removing the skins by subjecting the meats to the action of a jet of water.

5. That step in the process of peeling peaches which comprises subjecting the fruit to a mild abrasive action in the surface scum of a boiling solution of caustic soda for a sufficient length of time to break and partially remove the skins but not long enough to effect a complete removal thereof.

6. The process of peeling peaches which comprises chilling to a degree sufficient to make the meats firm, abrading the fruit in a caustic solution substantially at the boiling point, and concurrently lubricating the fruit to prevent abrasion of the meats.

7. The process of peeling peaches which comprises chilling to a degree sufficient to make the meats firm, immersing in a solution of caustic soda at about the boiling point, and therein subjecting the fruit to a mild abrasive action while lubricated with the surface slime of said solution.

MOSES BARODY.